United States Patent [19]

Chitayat

[11] Patent Number: 4,505,464
[45] Date of Patent: Mar. 19, 1985

[54] HIGH PRECISION WORKPIECE POSITIONING TABLE

[75] Inventor: Anwar Chitayat, Northport, N.Y.

[73] Assignee: Anorad Corporation, Hauppauge, N.Y.

[21] Appl. No.: 479,611

[22] Filed: Mar. 28, 1983

[51] Int. Cl.³ .............................................. B23Q 1/02
[52] U.S. Cl. ............................................ 269/73; 269/8; 269/21; 269/74; 269/289 MR; 308/3 A
[58] Field of Search .................. 269/71, 73, 74, 8, 21, 269/289 R, 289 MR; 308/3 A, 6 R; 350/86, 90; 108/137, 143; 33/1 M, 174 TA

[56] References Cited

U.S. PATENT DOCUMENTS

| | | | |
|---|---|---|---|
| 3,076,682 | 2/1963 | Brault | 308/6 R |
| 4,234,057 | 11/1980 | Nakane et al. | 308/6 R |
| 4,234,175 | 11/1980 | Sato et al. | 269/73 |
| 4,278,348 | 7/1981 | Funk et al. | 269/21 |
| 4,392,642 | 7/1983 | Chitayat | 269/73 |

Primary Examiner—Robert C. Watson
Attorney, Agent, or Firm—Thomas R. Morrison

[57] ABSTRACT

A high-precision positioning table employs magnetic attraction to guide a table along at least one axis. Precision roller bearings between flat guide ways provide the support. A linear DC motor provides force for positioning along an axis without backlash. The linear motor also contributes attractive force aiding in the guidance or retention of the table. A vacuum lock secures the table in a selected position.

13 Claims, 5 Drawing Figures

HIGH PRECISION WORKPIECE POSITIONING TABLE

BACKGROUND OF THE INVENTION

The present invention relates to workpiece positioning tables and, more particularly, to workpiece positioning tables requiring the highest accuracy and repeatability.

Workpiece positioning tables are employed to position an object along one, two or three axes for performing a function on the workpiece. For example, workpiece positioning tables are employed in the manufacture of integrated circuit chips. In such manufacture, a silicon chip to be treated is mounted on the table and the table is controlled in one, two, three or more dimensions to position specific portions of the workpiece with respect to a stationary reference frame. One such positioning table is disclosed in U.S. Pat. No. 4,013,280.

In the referenced U.S. patent, a table is guided along one axis by upwardly projecting arms of a base. Guidance is provided by facing V-notches in the table and in the upwardly projecting arms with crossed pairs of roller bearings bridging parallel opposed surfaces of the notches.

Although the crossed bearings of the referenced patent significantly improve guidance accuracy of positioning tables, a limit to the accuracy obtainable is enforced by the ability to accurately machine the V-notches and by the accuracy of roller bearings. The guidance inaccuracies arising from notch and roller bearing variations is exhibited in directions transverse to the motion of the table.

In addition to transverse inaccuracies, a positioning table can exhibit inaccuracies along the axis of motion. High precision positioning tables of the prior art have employed lead screws driven by a servomotor attached to the base driving a precision circulating-ball nut attached to the table. Such screw drive systems are affected by backlash and by shaft windup as well as by limited acceleration capability. In a prior U.S. Pat. Ser. No. 195,238 now U.S. Pat. No. 4,378,709, the inventor of the present application has disclosed a friction drive system which replaces the lead screw drive with direct friction drive from a motor shaft to a bar attached to the table. In a further U.S. Pat. Ser. No. 383,351, the inventor of the present application has disclosed a direct drive linear motor in which the driving coils are affixed to one of the base and the table and a set of permanent magnets is affixed to the other of the base and the table. With appropriate drive signals, extreme accuracy can be obtained without backlash.

The disclosures of the above U.S. patent and the two referenced U.S. patent applications are herein incorporated by reference and made a part hereof.

The improved drive systems disclosed in the above-referenced patent applications have made it possible to reduce longitudinal positioning errors to the point that transverse errors due to guidance inaccuracies now dominate. When the task to be done requires repeatable positioning to dimensions on the order of one micron or less ($10^{-6}$ meters), such requirements lie beyond the leading edge of current accuracies in V-notch and roller bearing technology.

Manufacturing processes of solid-state devices are moving toward requirements for positioning on the micron and submicron order. As noted, present guidance techniques pollute the longitudinal drive accuracy to such an extent that the requirements of such solid-state processing cannot be met by the prior art.

OBJECTS AND SUMMARY OF THE INVENTION

Accordingly, it is an object of the present invention to provide a workpiece positioning table which overcomes the drawbacks of the prior art.

It is a further object of the invention to provide a workpiece positioning table in which higher guidance accuracy can be achieved.

It is a still further object of the invention to provide a workpiece positioning table in which guidance is performed by roller bearings engaging opposed flat ways.

It is a further object of the invention to employ opposed flat ways with roller bearings therebetween with magnetic retention to maintain uniform engagement between the roller bearings and the flat ways.

It is a further object of the invention to provide permanent magnetic retention of a table in a positioning table to its support in at least one dimension.

It is a further object of the invention to provide magnetic retention of a table in a positioning table in two dimensions.

According to an aspect of the present invention, there is provided a positioning table, comprising a table, means for supporting the table, means for controlling movement of the table along an axis, at least one flat way on the means for supporting having a first flat face in a plane normal to the axis, at least a second flat way on the table having a second flat face parallel to the plane and facing the first flat face, bearing means between the first and second flat faces, a first magnetic attraction element affixed to the table, a second magnetic attraction element affixed to the means for supporting within an attractive magnetic influence of the first magnetic attraction element, and the first and second magnetic attraction elements being disposed to produce a magnetic attractive force between them effective to urge the first and second flat faces toward each other into contact with the bearing means whereby the table is guided along the axis.

According to a feature of the present invention, there is provided a vacuum lock for a positioning table of the type having a base and a table movable along an axis with respect to the base, comprising a vacuum puck, a front face on the vacuum puck, a ridge encircling the front face, one of the base and the table having a plane surface parallel to the axis, means for supporting the vacuum puck with the ridge generally parallel to, and facing, the plane surface, means for rigidly affixing the means for supporting to the other of the base and the table, a solenoid effective, when energized, to displace the vacuum puck sufficiently to move the ridge into sealing contact with the plane surface, and means for applying a vacuum between the front face and the plane surface, the vacuum being effective to adhere the vacuum puck to the plane surface whereby relative motion of the base and the table is prevented.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
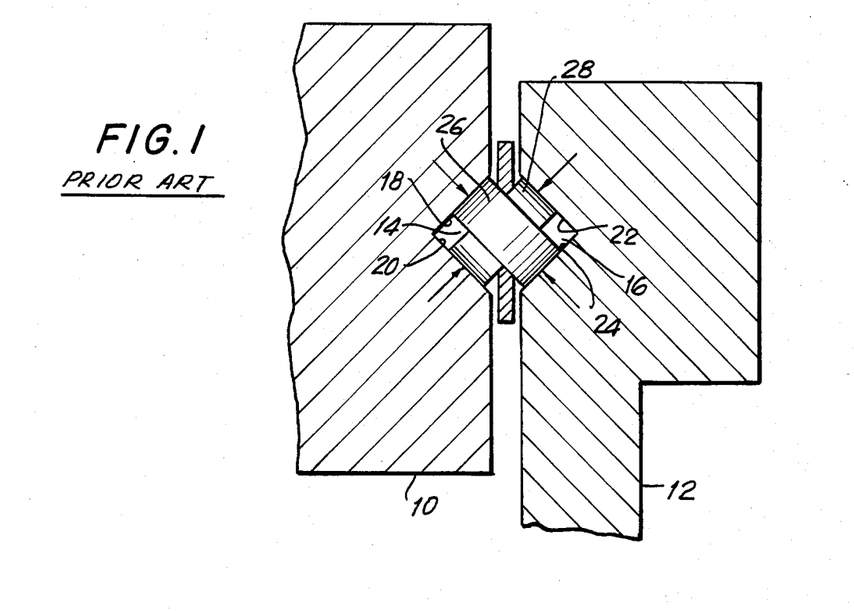
FIG. 1 is a cross-sectional diagram of a portion of a positioning table according to the prior art.

Referring now to FIG. 1, a table 10 of a positioning table according to the referenced prior patent is supported by a pair of upwardly projecting sidewalls 12, only one of which is shown. A V-notch 14 in table 10 faces a V-notch 16 in sidewall 12. One face 18 of V-notch 14 is disposed at 90° to a second face 20 of V-notch 14. Similarly, faces 22 and 24 in V-notch 16 are disposed at 90° to each other and are each parallel to one of faces 18 and 20 of V-notch 14. One roller bearing 26 bears on faces 18 and 24. A second roller bearing 28, having its axis inclined 90° to the axis of roller bearing 26, bears against faces 20 and 22. A bearing retainer 30 retains roller bearings 26 and 28 in a correct axial position. Roller bearings 26 and 28 are only one of a number of pairs of similarly oriented roller bearings disposed along the length of table 10 for maintaining guidance.

As disclosed in the referenced patent, sidewall 12 is preloaded toward table 10 so that a substantial force is resiliently applied through faces 22 and 24 to roller bearings 28 and 26 respectively. This force is resisted by faces 18 and 20 as indicated by the arrows facing bearing points of roller bearings 26 and 28. It will be noted that the applied forces are inclined 45° to the horizontal and vertical axes of table 10. Thus, an error in one of the faces such as, for example, face 18 can result in a positioning error both horizontally and vertically in FIG. 1. With four machined faces 18, 20, 22 and 24, a variety of errors may occur giving rise to combinations of positioning error as table 10 is moved along its axis.

Errors in the prior art device of FIG. 1 can be reduced by accurately machining and polishing faces 18, 20, 22 and 24 and carefully controlling the manufacture of roller bearings 26 and 28. The limiting accuracy appears to be the ability to accurately machine four faces 18, 20, 22 and 24 along an extended length of V-notches 14 and 16.

It will be noted that table 10 and sidewall 12 are cross-hatched for metal. In ultraprecise systems, the use of metal is not indicated. Thermal expansion and contraction of metals can be on an order which exceeds the allowed accuracy. Furthermore, no matter how carefully metal parts are formed, residual stresses remain which become relieved over time thereby changing the geometry of a part. Errors from this source can also be of an order of magnitude which exceeds the permitted tolerances of ultraprecision systems.

Figure 2:
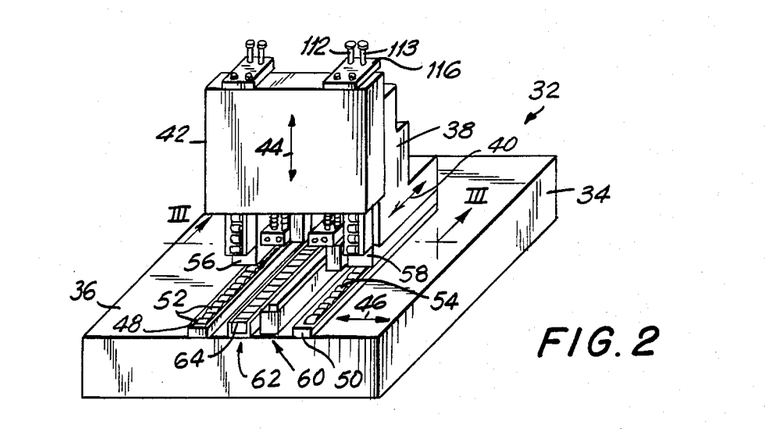
FIG. 2 is a perspective view of a two-axis positioning table according to an embodiment of the invention.

Referring now to FIG. 2, there is shown, generally at 32, a positioning table according to the present invention. In order to reduce to a minimum dimensional changes arising from thermal variations and stress relief, granite is employed for a number of components. Certain selected varieties of granite were formed millions of years ago and, over time, substantially all residual stresses have become relieved to result in a material that is substantially inert and has constant dimensions over an extended period of time. Granite also has a relatively low temperature coefficient of expansion. In certain applications, even the small temperature coefficient of granite produces changes which are not acceptable. In such situations, positioning table 32 may be maintained in a temperature-controlled environment. In addition, environmental particulate pollution can significantly affect positioning at the accuracy levels of interest. Thus, positioning table 32 may be enclosed in a clean environment. Since thermal and pollution-controlled environments are conventional and do not form a part of the present invention, description thereof is omitted.

A granite base 34, which may be composed of from a few hundred to several thousand pounds of granite, includes a level top surface 36. A granite structure 38 which is identified as an X-axis granite is disposed to move along an X-axis identified by double-headed arrow 40. A Z-axis granite 42 is supported on, and moves with respect to X-axis granite 38 along a Z-axis indicated by a double-headed arrow 44.

A Y-axis table (not shown) may be disposed on granite base 34 or elsewhere for motion along a Y-axis at right angles to X-axis 40 and Z-axis 44.

In more detail now, X-axis flat ways 48 and 50 are disposed on granite base 34. Horizontal surfaces of X-axis flat ways 48 and 50 are carefully and accurately ground and polished with high precision. The fact that these surfaces are parallel and flat permits high accuracy in figuring the upward-facing surfaces using optical grinding methods. Alternatively, X-axis flat ways 48 and 50 may be replaced by accurately grinding and figuring the upper surface of granite base 34 itself.

Roller bearing assemblies 52 and 54 are disposed on the upper surfaces of X-axis flat ways 48 and 50. A pair of support flat ways 56 and 58 are affixed to the bottom of X-axis granite 38 and are supported on roller bearing assemblies 52 and 54 respectively. The bottom bearing surfaces of support flat ways 56 and 58 are accurately ground and figures for flatness. These bottom surfaces are also capable of close control of flatness since they are parallel and flat.

Figure 3:
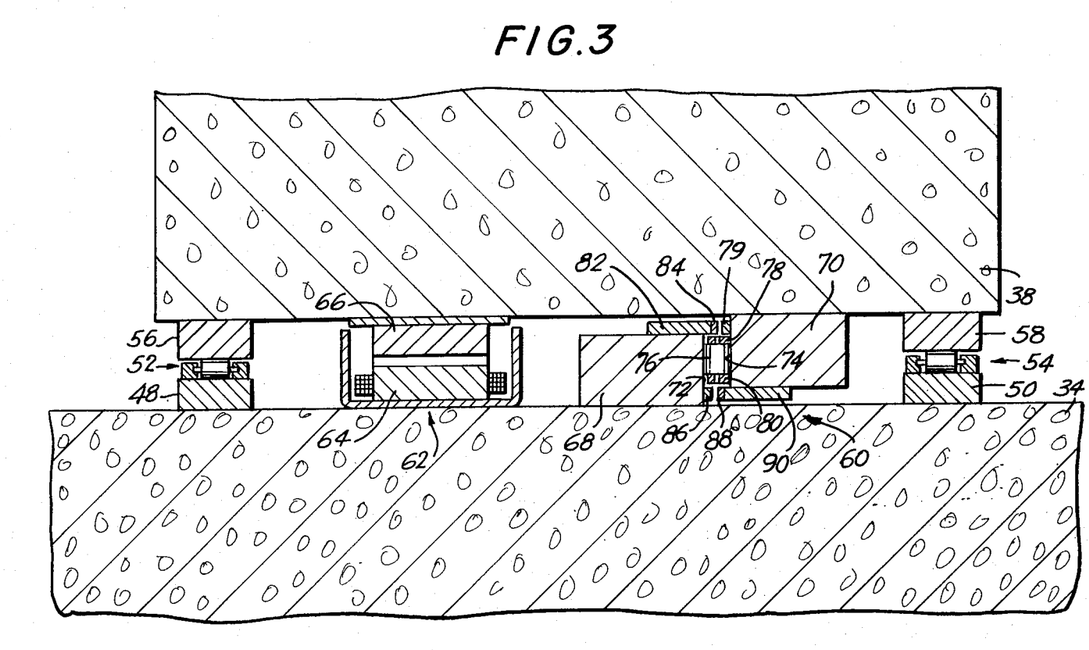
FIG. 3 is a cross section taken along III—III of FIG. 2.

Referring now also to FIG. 3, a magnetic horizontal preload assembly 60 accurately guides X-axis granite 38 in a straight line parallel to X-axis 40. A linear motor shown generally at 62 has a stator 64 affixed to granite base 34 and a moving portion 66, corresponding to a rotor of a motor, affixed to X-axis granite 38. Linear motor 62 may be of the type fully disclosed in one of the referenced patent applications whose disclosure is herein incorporated by reference. Thus, further description of linear motor 62 is omitted except insofar as the particular properties of linear motor 62 have special relevance to the present invention.

Magnetic horizontal preload assembly 60 includes a guide way 68 affixed to granite base 34 and a guide way 70 affixed to X-axis granite 38. Guide ways 68 and 70 include surfaces 72 and 74 which are ground and polished for extreme flatness. A plurality of rollers 76, only one of which is shown in the cross section of FIG. 3, are disposed between surfaces 72 and 74. Rollers 76 are preferably retained in their operating positions by a roller retainer 78 and roller retainer guides 79.

Although guide ways 68 and 70 can be of any convenient material such as, for example, metal, the reasons given for the selection of granite for granite base 34 and X-axis granite 38 apply to guide ways 68 and 70. Thus, guide ways 68 and 70 are preferably of granite with surfaces 72 and 74 accurately polished and figures for flatness. In addition, although roller type bearings with flat ways are preferred, other types of bearings such as barrel, ball or tapered may be used in other types of bearing ways or races without departing from the spirit of the invention.

A strip 80 of ferromagnetic material is disposed along an upper portion of surface 74. A magnet holding bar 82 affixed to an upper surface of guide way 68 supports a plurality of permanent magnets 84 in close facing proximity to ferromagnetic strip 80. The spacing between ferromagnetic strip 80 and permanent magnet 84 is preferably as small as possible and, in the preferred embodiment, a spacing of about 0.001 inches may be employed. Permanent magnets 84 are preferably powerful magnets and most preferably are samariam cobalt magnets having one of their poles facing ferromagnetic strip 80. The attraction between magnets 84 and ferromagnetic strip 80 depends on the number of permanent magnets 84, the facing area and the spacing between permanent magnets 84 and ferromagnetic strip 80. The magnetic attraction tends to draw guide ways 68 and 70 toward each other whereby surfaces 72 and 74 are magnetically forcibly retained in contact with rollers 76.

Similarly, a ferromagnetic strip 86 at a position near the bottom of surface 72 faces a plurality of permanent magnets 88 supported by a magnet holding bar 90 affixed to the bottom surface of guide way 70. Magnetic attraction between magnets 88 and ferromagnetic strip 86 further urges guide ways 68 and 70 together.

The magnetic attraction provided by magnets 84 and 88 may be from a few pounds to several hundred pounds so that firm control of motion of X-axis granite 38 along the axis in and out of the page in FIG. 3 is provided with transverse variations limited to inaccuracies in surfaces 72 and 74 and rollers 76.

The weight of X-axis granite 38 which may be, for example, several hundred pounds, provides downward force for firm contact of surfaces of X-axis flat ways 48 and 50 and support flat ways 56 and 58 with roller bearings in roller bearing assemblies 52 and 54. However, as is noted in the referenced patent application, linear motor 62 includes a plurality of permanent magnets in moving portion 66 closely spaced to a mass of ferromagnetic material in stator 64 so that linear motor 62 produces an attractive force between granite base 34 and X-axis granite 38 which adds to the gravitational force.

Although not shown in FIG. 3, a position and/or velocity sensing apparatus is conventionally employed in a positioning table. Since such apparatus is conventional, it neither shown in FIG. 3 nor described.

Figure 4:
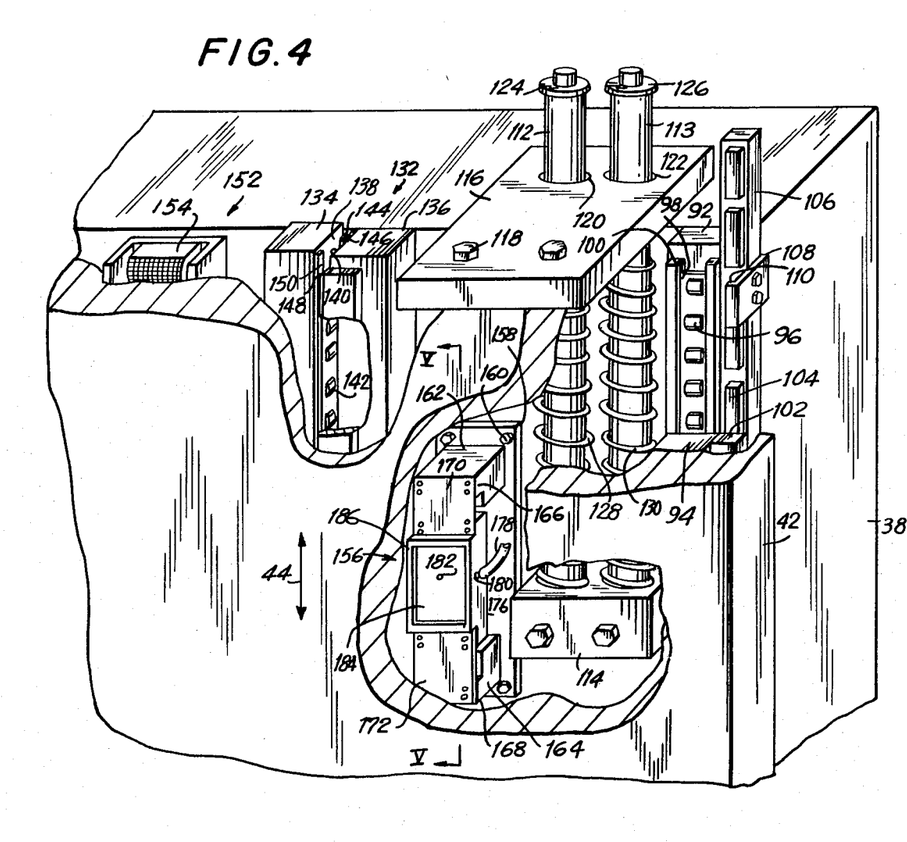
FIG. 4 is a perspective view partially cut away of a portion of the positioning table of FIG. 2.

Referring now to FIG. 4, the support, guidance and drive apparatus for Z-axis granite 42 is shown. A Z-axis flat way 92 faces a support flat way 94 with a plurality of rollers 96 interposed therebetween. Rollers 96 are conventionally supported in relative positions by a roller retainer 98 which is free to slide between a pair of roller retainer guides 100.

A ferromagnetic strip 102 is affixed to the side of support flat way 94 facing a plurality of permanent magnets 104 affixed to a magnet holding bar 106. Attraction of permanent magnets 104 for magnetic strip 102 tends to hold the flat facing surfaces of Z-axis flat way 92 and support flat way 94 in firm contact with rollers 96. An L-shaped safety clip 108 is affixed to the side of magnet holding bar 106 projecting alongside ferromagnetic strip 102 and having a short arm 110 which embraces ferromagnetic strip 102 and prevents it from moving away more than a short distance from permanent magnets 104. This is a safety feature to prevent massive Z-axis granite 42 from accidentally separating from X-axis granite 38 and falling to damage equipment or personnel. A pair of spring guide rods 112 and 113 are clamped at their lowest ends to a mounting block 114 affixed to X-axis granite 38. A support plate 116 is affixed along a top surface of Z-axis granite 42 by any convenient means such as, for example, by bolts 118. Spring guide rods 112 and 113 extend through holes 120 and 122 in support plate 116 and include stop discs 124 and 126 at the upper extremities thereof. Stop discs 124 and 126 prevent disengagement of support plate 116 from spring guide rods 112 and 113.

Helical springs 128 and 130, biased between mounting block 114 and the underside of support plate 116, support approximately half the total weight of Z-axis granite 42 and the additional elements mounted upon it. The other half of the weight is supported by corresponding helical springs on guide rods (not shown) at the other end of Z-axis granite 42. The second end of Z-axis granite 42 is identically arranged for guidance and support and is, therefore, omitted from FIG. 4 and the description.

A magnetic horizontal preload assembly 132 is similar to magnetic horizontal preload assembly 60 previously described. Z-axis guide ways 134, affixed to Z-axis granite 42 and 136 affixed to X-axis granite 38, include accurately flat facing surfaces 138 urged into bearing contact against a plurality of rollers 142 by attraction of permanent magnets 144, affixed to X-axis guide way 134, for a ferromagnetic strip 146 affixed to X-axis guide way 136. Additional magnetic attraction is provided by permanent magnets 148 affixed to Z-axis guide way 136 facing a ferromagnetic strip 150.

A linear motor 152, having a stator 154 affixed to X-axis granite 38 and a movable portion (not shown) affixed aligned with stator 154 on the rear surface of Z-axis granite 42, is substantially identical to linear motor 62 which is, in turn, fully disclosed in the referenced patent application. The horizontal attraction between the permanent magnets (not shown) and the mass of ferromagnetic material in stator 154 tends to urge Z-axis granite 42 toward X-axis granite 38 and to further improve the magnetic retention of Z-axis granite 42 against rollers 96 and the counterpart rollers (not shown) at the other edge of Z-axis granite 42.

Since substantially all of the weight of Z-axis granite 42 as well as any additional load attached thereto to perform its function is supported on helical springs 128 and 130 as well as their counterparts not shown, linear motor 52 is called on to provide only a small motive force to position Z-axis granite 42 in a desired vertical position. A conventional position and/or velocity sensing apparatus is provided to update the position and/or velocity of Z-axis granite 42. Since this apparatus is conventional, it is neither shown nor described.

It will be apparent that guidance of Z-axis granite 42 is such that inaccuracies normal to the direction of motion are due solely to flatness of bearing surfaces and accuracy of rollers. Since such flatness can be very accurately controlled and such rollers can be produced with extreme accuracy, a new dimension in positioning accuracy is provided by the apparatus shown and described herein.

Figure 5:
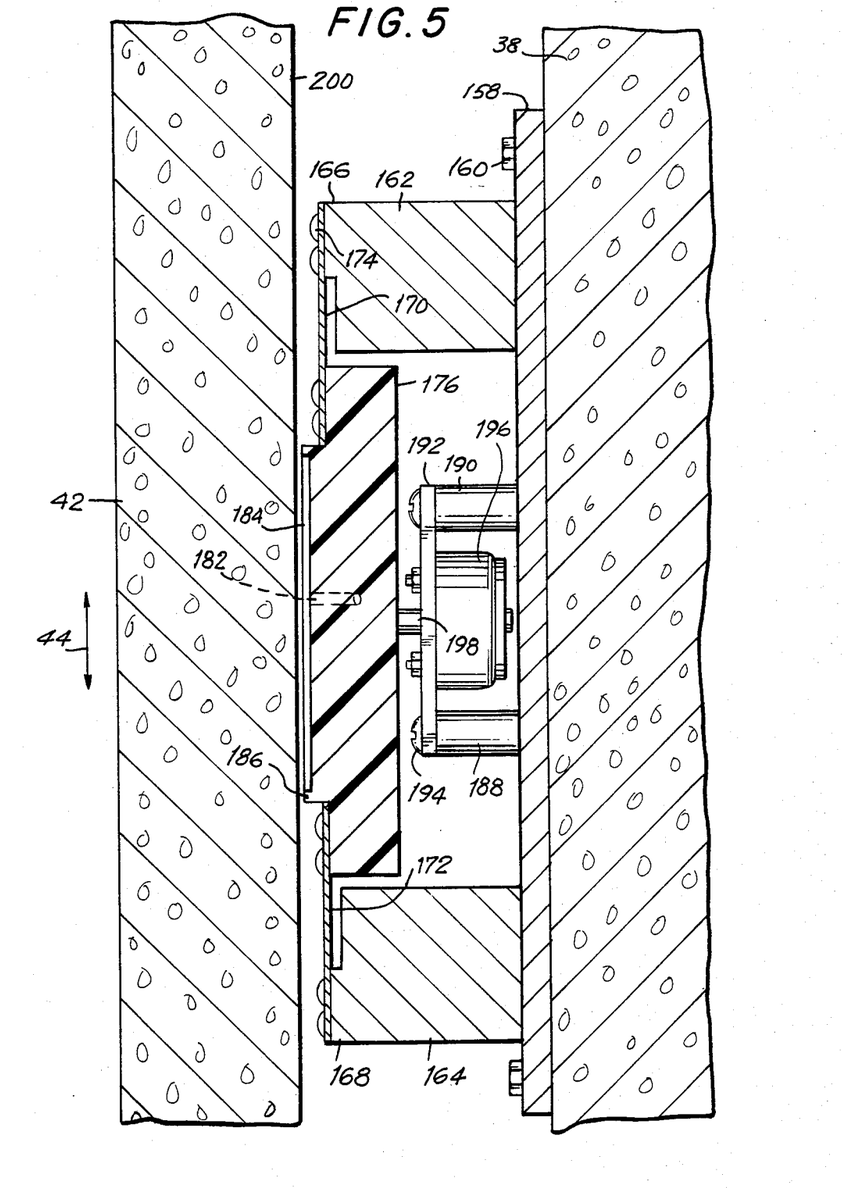
FIG. 5 is a cross section taken along V—V of FIG. 4.

A vacuum lock, shown generally at 156 in FIG. 3, locks Z-axis granite 42 in a selected position with respect to X-axis granite 38. Referring now also to FIG. 5, vacuum lock 156 includes a base 158 affixed to X-axis granite 38 by any convenient means such as, for example, by bolts 160. A pair of standoffs mounted on base 158 include pedestal portions 166 and 168 at outer extremities thereof. A pair of flat springs 170 and 172 are each affixed to one end to a pedestal portion 166 and 168 respectively by any convenient means such as, for example, by rivets 174.

Flat springs 170 and 172 suspend between them a vacuum puck 176. A flexible vacuum hose 178 communicates a vacuum at selected times to a fitting 180 in vacuum puck 176. Fitting 180, in turn, communicates the vacuum to an opening 182 in a front face 184 of vacuum puck 176. A ridge 186 completely surrounds front face 184.

Referring now also to FIG. 5, four standoffs, of which only two, 188 and 190 are shown, are mounted on base 158. A solenoid mounting plate 192 is affixed at the distal ends of standoffs 188 and 190 by any convenient means such as, for example, by screws 194, support a solenoid 196. A solenoid plunger 198 is centered in the rear of vacuum puck 176.

With solenoid 196 deenergized, flat springs 170 and 172 support ridge 186 spaced a short distance from a rear surface 200 of Z-axis granite 42. In the preferred embodiment, the spacing of ridge 186 from rear surface 200 is approximately 0.001 inches. The depth of front face 184 below ridge 186 can be any convenient depth but, in the preferred embodiment, a depth of about 0.005 inches is satisfactory. In the deenergized and quiescent position shown, a vacuum supply may be connected to vacuum hose 178 to thereby produce an air flow through opening 182 which is supplied through the gap between ridge 186 and rear surface 200. Since ridge 186 encircles the entire front face 184, a relatively large supply area is provided for this air flow. Alternatively, the vacuum supply to opening 182 may be inactive in the quiescent condition shown.

When the desired position of Z-axis granite 72 is attained, solenoid 196 is energized thereby urging solenoid plunger 198 toward the rear surface of vacuum puck 176. This displaces vacuum puck 176 forward on flat springs 170 and 172 until ridge 186 comes into sealing contact around its entire perimeter with rear surface 200 of Z-axis granite 42. A vacuum applied to opening 182 at this time draws a partial vacuum in the area defined by ridge 186. Since this area is relatively large, a substantial adhering force is provided to securely lock vacuum puck 176 to rear surface 200. Flat springs 170 and 172 carry through any forces in direction 44 to standoffs 162 and 164 which, in turn, carry through such forces through base 158 to X-axis granite 38. Standoffs 188 and 190 are large rigid objects and are rigidly mounted to base 158. Thus, vacuum puck 176 is rigidly held against motion in direction 44 to thereby lock Z-axis granite in place.

As soon as an effective vacuum is produced inside ridge 186, further urging by solenoid 196 is no longer required. Solenoid 196 may, therefore, be deenergized after a short period.

To release the vacuum lock, the vacuum between front face 184 and surface 200 must be released. When this is done, flat springs 170 and 172 return vacuum puck to the quiescent position shown in FIG. 5 with a small space between ridge 186 and rear surface 200. Instead of merely releasing the vacuum, faster brake release could be produced by applying positive pressure on vacuum hose 178. However, in the preferred embodiment, application and release of vacuum is employed.

Having described the specific preferred embodiments of the invention with respect to the accompanying drawings, it is to be understood that the invention is not limited to those precise embodiments and that various changes and modifications may be effected therein by one skilled in the art without departing from the scope or spirit of the invention as defined in the appended claims.

I claim:

1. A positioning table, comprising: a table;
   means for supporting said table;
   means for controlling movement of said table along an axis;
   at least one flat way on said means for supporting having a first flat face in a plane normal to said axis;
   at least a second flat way on said table having a second flat face parallel to said plane and facing said first flat face;
   rollable bearing means between said first and second flat faces;
   a first magnetic attraction element affixed to said table;
   a second magnetic attraction element affixed to said means for supporting within an attractive magnetic influence of said first magnetic attraction element; and
   said attractive magnetic influence of said first and second magnetic attraction elements including means for magnetically urging said first and second flat faces toward each other into contact with opposed sides of said rollable bearing means whereby said table is guided along said axis.

2. A positioning table according to claim 1, wherein said table includes a plane surface, said means for controlling movement includes a vacuum lock affixed to said means for supporting, said vacuum lock including a front face adjacent said plane surface, means for supporting said front face spaced parallel to said plane surface, means for urging said front face toward said plane surface, and means for producing a vacuum between said front face and said plane surface whereby said table is locked into a position.

3. A positioning table according to claim 1, wherein said means for supporting includes a horizontal base, first and second flat horizontal surfaces upward facing on said base parallel to said axis, third and fourth flat horizontal surfaces downward facing below said table and facing said first and second flat horizontal surfaces, a first plurality of rollable bearing means between said first and third flat horizontal surfaces, a second plurality of rollable bearing means between said second and fourth flat horizontal surfaces, said axis being horizontal, said first, second, third and fourth flat horizontal surfaces and said first and second rollable bearing means being effective to support said table, and said plane including said axis and a vertical line.

4. A positioning table, comprising:
   a table;
   means for supporting said table;
   means for controlling movement of said table along an axis;
   at least one flat way on said means for supporting having a first flat face in a plane normal to said axis;

at least a second flat way on said table having a second flat face parallel to said plane and facing said first flat face;
bearing means between said first and second flat faces;
a first magnetic attraction element affixed to said table;
a second magnetic attraction element affixed to said means for supporting within an attractive magnetic influence of said first magnetic attraction element;
said first and second magnetic attraction elements being disposed to produce a magnetic attractive force between them effective to urge said first and second flat faces toward each other into contact with said bearing means whereby said table is guided along said axis; and
said means for controlling movement including a linear motor, said linear motor including a stator affixed to one of said means for supporting and said table and an aligned moving element affixed to the other of said means for supporting and said table, said stator and said moving element including magnetic mutually attracting means effective to urge said table toward said means for supporting.

5. A positioning table, comprising:
a table;
means for supporting said table;
means for controlling movement of said table along an axis;
at least one flat way on said means for supporting having a first flat face in a plane normal to said axis;
at least a second flat way on said table having a second flat face parallel to said plane and facing said first flat face;
bearing means between said first and second flat faces;
a first magnetic attraction element affixed to said table;
a second magnetic attraction element affixed to said means for supporting within an attractive magnetic influence of said first magnetic attraction element;
said first and second magnetic attraction elements being disposed to produce a magnetic attractive force between them effective to urge said first and second flat faces toward each other into contact with said bearing means whereby said table is guided along said axis; and
said axis is vertical, said means for supporting including resilient means effective to support the weight of said table, a third flat way on said means for supporting having a third flat face in a second plane normal to the first-mentioned plane and parallel to said axis, a fourth flat way on said table having a fourth flat face parallel to said second plane and facing said third flat face, second bearing means between said third and fourth flat faces, at least a third magnetic attraction element affixed to said table, at least a fourth magnetic attraction element affixed to said means for supporting within an attractive magnetic influence of said third magnetic attraction element, said third and fourth magnetic attraction elements including means for magnetically urging said third and fourth flat faces toward each other into contact with said second bearing means whereby said table is further guided along said axis.

6. A positioning table according to claim 5, wherein said means for controlling movement includes a linear motor, said linear motor including a stator affixed to one of said means for supporting and said table and a moving element affixed to the other of said means for supporting and said table, said stator and said moving element including magnetic mutually attracting means effective to urge at least one facing pair of said first and second and said third and fourth flat faces toward each other whereby one of the first-mentioned and said second magnetic attractive forces is augmented.

7. A positioning table according to claim 1, wherein said axis is horizontal, said table includes a vertical surface and further comprising:
a second table;
second means for supporting said second table on the first-mentioned table spaced from and parallel to said vertical surface;
second means for controlling motion of said second table along a vertical axis parallel to said vertical surface;
a third flat way on said vertical surface having a third flat face, said third flat face being in a vertical plane normal to said vertical surface;
a fourth flat way having a fourth flat face parallel to said vertical plane;
second rollable bearing means between said third and fourth flat faces;
a third magnetic attraction element affixed to said vertical surface;
a fourth magnetic attraction element affixed to said second table within an atractive magnetic influence of said third magnetic attraction element; and
said attractive magnetic influence of said third and fourth magnetic attraction elements including means for urging said third and fourth flat faces toward each other into contact with said second rollable bearing means whereby said second table is guided along said vertical axis.

8. A positioning table according to claim 7, wherein said second means for controlling includes a linear motor.

9. A positioning table, comprising:
a table;
means for supporting said table;
means for controlling movement of said table along an axis;
at least one flat way on said means for supporting having a first flat face in a plane normal to said axis;
at least a second flat way on said table having a second flat face parallel to said plane and facing said first flat face;
bearing means between said first and second flat faces;
a first magnetic attraction element affixed to said table;
a second magnetic attraction element affixed to said means for supporting within an attractive magnetic influence of said first magnetic attraction element;
said first and second magnetic attraction elements being disposed to produce a magnetic attractive force between them effective to urge said first and second flat faces toward each other into contact with said bearing means whereby said table is guided along said axis;
said axis is horizontal, said table includes a vertical surface and further comprising:
a second table;

second means for supporting said second table on the first-mentioned table spaced from and parallel to said vertical surface;

second means for controlling motion of said second table along a vertical axis parallel to said vertical surface;

a third flat way on said vertical surface having a third flat face, said third flat face being in a vertical plane normal to said vertical surface;

a fourth flat way having a fourth flat face prallel to said vertical plane;

second bearing means between said third and fourth flat faces;

a third magnetic attraction element affixed to said vertical surface;

a fourth magnetic attraction element affixed to said second table within an attractive magnetic influence of said third magnetic attraction element;

said third and fourth magnetic attraction elements being disposed to produce a magnetic attractive force between them effective to urge said third and fourth flat faces toward each other into contact with said second bearing means whereby said second table is guided along said vertical axis;

said second means for controlling including a linear motor;

said linear motor including means for magnetic attraction urging said second table toward said vertical surface.

10. A positioning table according to claim 7, further comprising at least one clip, said clip being effective to limit a maximum motion of said second table away from said second surface.

11. A positioning table according to claim 7, wherein said second means for controlling includes a vacuum lock effective for locking said second table into a position.

12. A vacuum lock for a positioning table of the type having a base and a table movable along an axis with respect to said base, comprising:

a vacuum puck;
a front face on said vacuum puck;
a ridge encircling said front face;
one of said base and said table having a plane surface parallel to said axis;
a plurality of flat springs lying in a plane substantially parallel to said plane surface;
first means for affixing a first end of each of said flat springs to said vacuum puck;
support means rigidly affixed to the other of said base and said table;
said support means and said plurality of flat springs being effective to dispose said vacuum puck with said ridge generally parallel to, facing, and spaced a predetermined distance from said plane surface;
a solenoid effective, when energized, to displace said vacuum puck said predetermined distance thereby to move said ridge into sealing contact with said plane surface;
second means for affixing a second end of each of said flat springs to said support means;
means for applying a vacuum between said front face and said plane surface, said vacuum being effective to adhere said vacuum puck to said plane surface and said flat springs and support means being effective to prevent relative motion of said base and said table.

13. A positioning table comprising:
a base;
a table;
bearing means for movably supporting said table from said base;
said bearing means including means for permitting planar motion of said table along a linear axis with respect to said base;
a linear motor;
said linear motor including a stator affixed to one of said base and said table aligned with said linear axis, and a moving element affixed to the other of said base and said table; and
said stator and said moving element including permanent magnetic mutually attracting means effective for urging said table toward said base.

* * * * *